Feb. 18, 1930.  J. N. WIENER ET AL  1,748,031
RUMBLE SEAT TOP
Filed Jan. 10, 1928  2 Sheets-Sheet 1
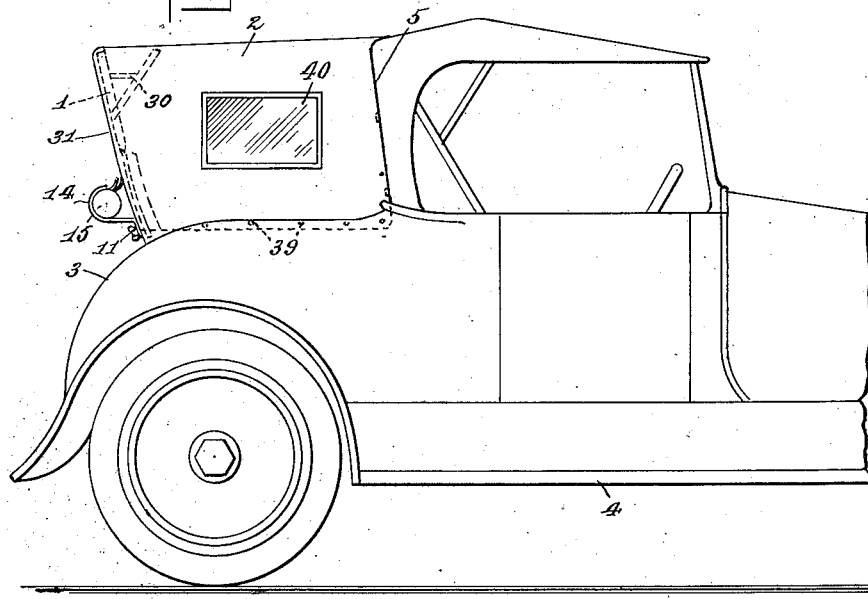
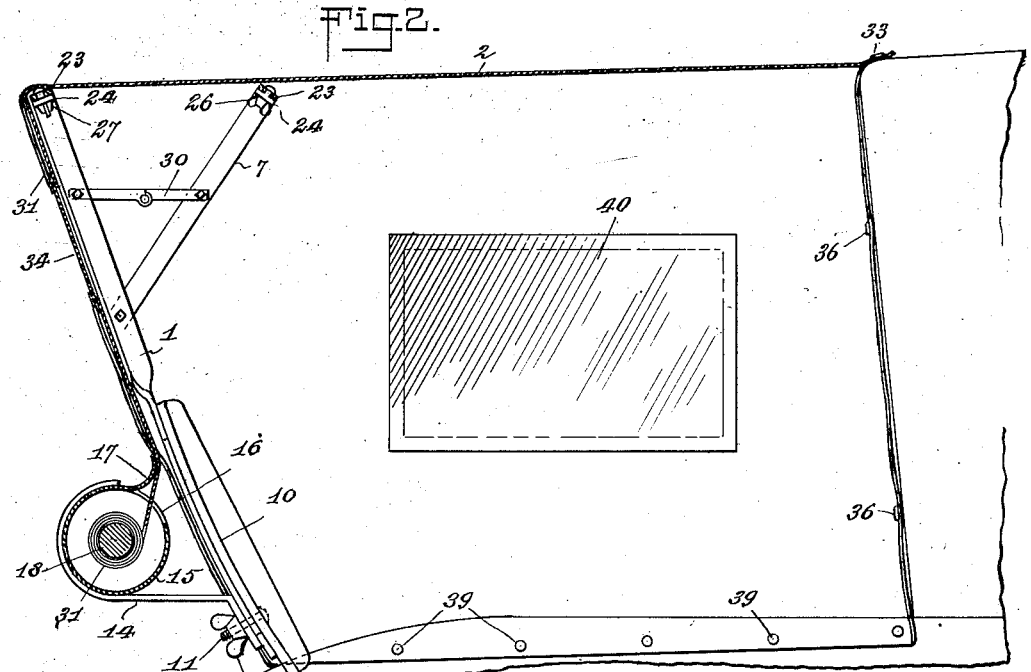
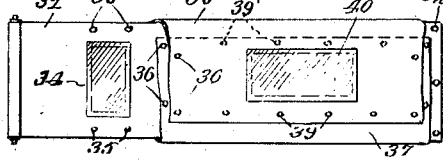
WITNESSES
William P. Goebel.
A. L. Kitchin
INVENTOR
Julius N. Wiener
Henry Aretsky
BY Munn & Co.
ATTORNEY Feb. 18, 1930. J. N. WIENER ET AL 1,748,031
RUMBLE SEAT TOP
Filed Jan. 10, 1928 2 Sheets-Sheet 2
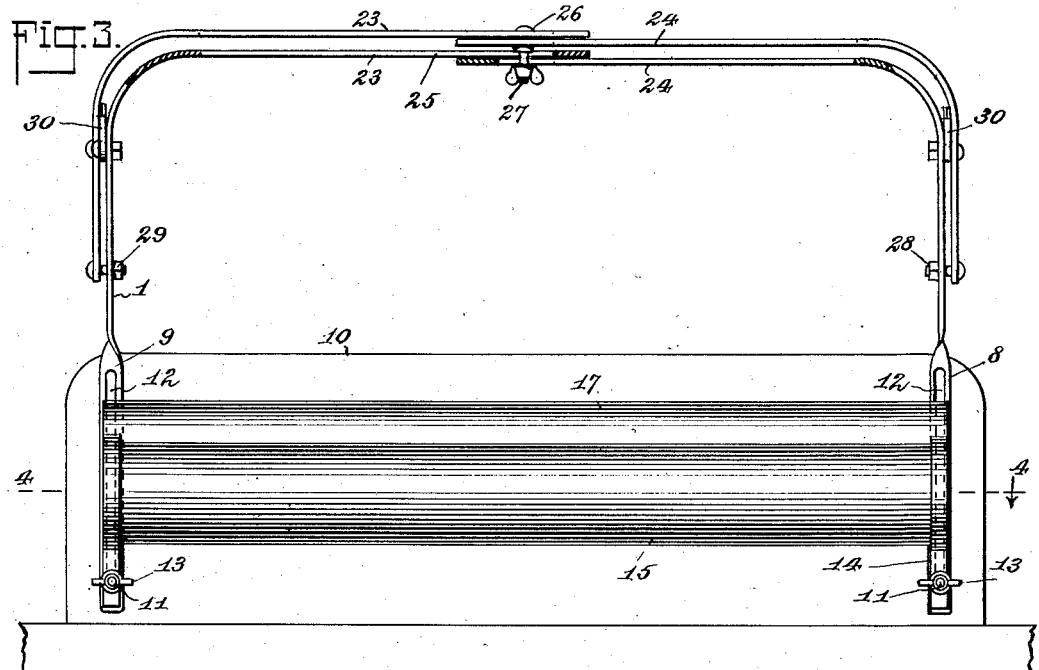
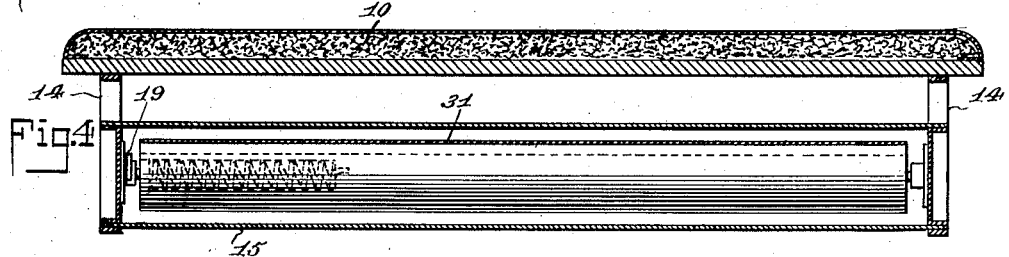
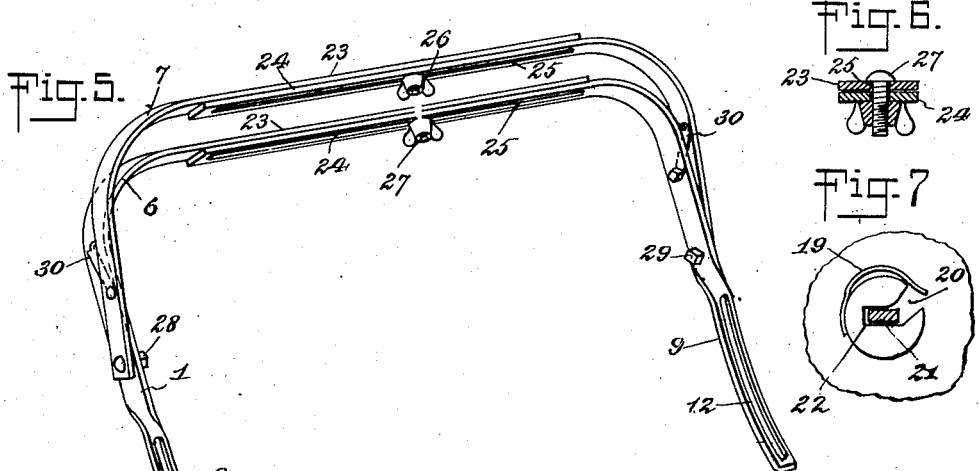
INVENTOR
Julius N. Wiener
Henry Aretsky
BY Munn & Co
ATTORNEY Patented Feb. 18, 1930

1,748,031

UNITED STATES PATENT OFFICE

JULIUS N. WIENER AND HENRY ARETSKY, OF BROOKLYN, NEW YORK

RUMBLE-SEAT TOP

Application filed January 10, 1928. Serial No. 245,726.

This invention relates to a top for an automobile rumble seat, and has for an object to provide an improved construction which is capable of being removably mounted on an automobile and act as a cover for a rumble seat without interfering with the comfort of those using the rumble seat.

Another object of the invention is to provide a rumble seat cover, wherein the top and sides are provided and arranged so that the top may be used alone or in connection with the sides and thereby provide a cover or a complete enclosure against the elements.

A still further object of the invention is to provide a rumble seat cover and support, all of which are removably connected to a seat or other part of the automobile, the connection being such that the parts may be quickly mounted or demounted.

In the accompanying drawings—

Figure 1 is a side view of part of an automobile disclosing a rumble seat support and cover involving the invention.

Figure 2 is a longitudinal vertical sectional view through Figure 1.

Figure 3 is a rear view of the supporting frame shown in Figure 2, said frame being broken away to illustrate the slotted arrangement of certain of the parts.

Figure 4 is a sectional view through Figure 3, approximately on line 4—4.

Figure 5 is a perspective view of the frame shown in Figure 3.

Figure 6 is a detail fragmentary sectional view through Figure 5 on line 6—6.

Figure 7 is a fragmentary view showing one end of the roller fastener illustrated in Figure 4.

Figure 8 is a plan view on a greatly reduced scale, of the cover structure shown in Figures 1 and 2, the side parts being shown folded over the top.

Referring to the accompanying drawings by numerals, 1 indicates a cover support and 2 a cover. These members are disengageably or removably secured to the body 3 of the automobile 4, and also to the canopy or top 5. The cover 2 and support 1, are particularly adapted to be used in connection with rumble seats of any kind of automobile, and to present an enclosure which will protect the occupants of the rumble seat fully against the elements.

In case of rain or other disturbance, the cover 2 may be completely closed and arranged as shown in Figures 1 and 2. This thoroughly protects the occupants of the rumble seat. Where a protection against the sun only is desired, the sides of the cover may be folded back over the top portion and, consequently, only a back and top covering member will be presented. It is evident that other adjustments may be provided without departing from the spirit of the invention.

As indicated particularly in Figure 5, the support 1 is formed from substantially U-shaped members 6 and 7. The U-shaped member 6 in addition, is formed with supporting sections 8 and 9 adapted to fit flatwise against the back of the rumble seat 10. A pair of bolts 11 are secured to the back of rumble seat 10 and positioned to extend through the respective slots 12 when the support is in position as shown in Figures 2 and 3. By reason of the slots 12, the support may be raised or lowered as circumstances may demand or as the occupants may wish. After the support has been properly positioned, the respective nuts 13 are tightened and the support is properly clamped in place. It will be evident that more than two bolts could be used without departing from the spirit of the invention, or if preferred, instead of slots 12, a series of holes could be used. The bolts 11 also pass through the lower ends of the respective brackets 14, which brackets are preferably soldered or otherwise rigidly secured to the casing 15, whereby said casing is supported at the rear of the rumble seat when the device is in use. This casing is provided with an opening 16, and the material removed when opening 16 is formed, is bent to present a guiding flange 17 for guiding the top 2 as it moves into and out of the casing 15. The casing 15 is sufficiently large to readily receive the entire cover 2 when not in use. One end of this cover is tacked or otherwise rigidly secured to a roller 18, which roller is provided with journal members at the ends and with a retractile spring identical in construction with an ordinary shade roller. In addition, a retaining spring or catch member 19 is provided as shown in Figure 7, said spring or catch member overlapping the entrance opening 20. The roller 18 is provided at one end with a spring structure identical with an ordinary shade roller, said spring structure being connected to the roller 18 and to bar 21 fitting into the notch 22. Preferably there are no pawls used in this roller as in an ordinary shade roller, whereby the spring (not shown) connected with the bar 21 will give the roller 18 a continuous tendency to wind up the cover 2. The respective frames 6 and 7 are each provided with overlapping sections 23 and 24. Each of these sections is provided with a slot 25 and in the respective slots are fitted bolts 26 and 27 whereby the effective width of the support 1 may be varied to take care of cars having rumble seats of different widths. After the bolts 26 and 27 have once been tightened for a particular car, they are not molested thereafter.

From Figures 2 and 5, it will be noted that the U-shaped frame 7 is pivotally mounted at points 28 and 29 to the frame 6, and may be folded over frame 6 as shown in Figure 5, or may be extended forwardly therefrom as shown in Figure 2. Knuckle links 30 are provided for limiting the forward swinging movement of frame 7 whereby a proper brace is secured to the rear part of the cover 2.

The cover 2 consists of a body or main strip 31 which has one end secured to the roller 18, and the opposite end provided with a number of fasteners 32. These fasteners may be in the nature of snap fasteners and co-acting with suitable fastening means 33 in the rear part of the canopy 5. Preferably the body 31 is rectangular and is provided with a window 34 which will be positioned approximately opposite the head of the person using the rumble seat when the cover is in use as shown in Figure 2. On each side of the window 34 are fastening means 35, preferably identical with fastening means 32 and co-acting with similar fastening means 36 on the side members 37 and 38. These side members are stitched or otherwise secured to the edges of body 31 and may be folded on top of body 31 as shown in Figure 8, or may be let down as shown in Figures 1 and 2. When let down, the fastening means 35 and 36 are used together with other fastening means 39, for connecting the low part of the side members to the automobile body 3 which is also preferably provided with co-acting fastening means. A window 40 is made in each of the side members 37 and 38 whereby plenty of light may be provided. When the weather is nice, the side members 37 and 38 are folded on top of the body 31 as shown in Figure 8 so that only the top and the rear end carrying window 34 is in actual use. This allows plenty of air in the sides. In case of rain, the side members 37 and 38 are merely pulled down and fastened as shown in Figure 1.

When it is desired to remove the cover and its support, the various fastening means associated with the cover 2 are disengaged, and the side members 37 and 38 folded as shown in Figure 8. The body 31, together with the side members, is then allowed to slide over the support 1 and gradually be wound on the roller 18. After the cover has been wound completely on roller 18, nuts 13 are removed and the support 1, bracket 14 and other parts are bodily removed from the rumble seat 10, and said seat closed if desired. By removing the nuts 13, the bracket 14 and the casing 15 are disconnected from the support 1 so that they may be separately stored in the automobile if desired. Also the support 1 may be stored beneath the rumble seat, and if necessary, the support may be constricted as far as width is concerned, by loosening bolts 26 and 27 for forcing the sides toward each other. Preferably the entire support 1, including the casing 15 and associated parts, are stored beneath the rumble seat so that the cover and its support are always ready to be used whenever desired. It is evident that the parts could be made out of any desired material and the cover 2 could be made from any suitable grade of canvas or other material. The various windows are preferably made from suitable transparent material which will readily bend so that these windows may be readily wound around the roller 18 when the parts are to be stored.

What we claim is:

In a rumble seat covering a substantially U-shaped supporting bracket adapted to be removably connected to a rumble seat and project upwardly therefrom, comprising a pair of members telescopically fitted together, each of said members having an arc-shaped lower end section adapted to fit against a rumble seat back, said end sections being slotted, a bolt for each of said end sections for clamping the end sections to a rumble seat, an auxiliary bracket pivotally mounted on the U-shaped bracket near the upper part thereof, a casing secured to said U-shaped supporting bracket at the lower end thereof, a roller mounted in said casing and a covering member secured at one end to said roller, said covering member being adapted to be partly removed from said casing and positioned to cover the rear part of said U-shaped supporting bracket and extend forwardly therefrom at the top and both sides of said U-shaped supporting bracket, said covering member extending over said auxiliary bracket to a point to present a canopy for the rumble seat space.

Signed at New York in the county of New York and State of New York this 7th day of January A. D. 1928.

JULIUS N. WIENER.
HENRY ARETSKY.